T. MERRELL.
Corn Harvester.
No. 124,757. Patented March 19, 1872.
Fig: 1
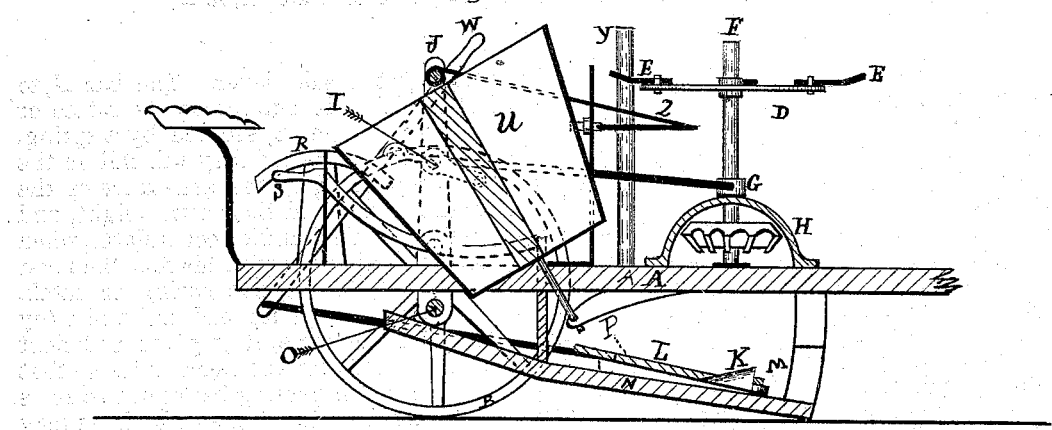
Fig: 2.
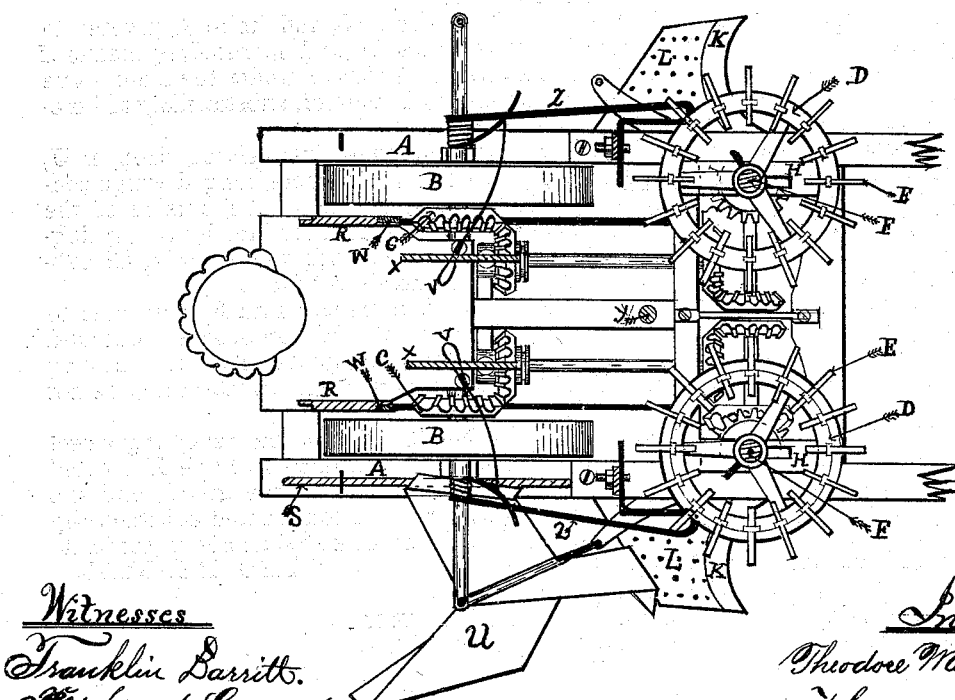
Witnesses
Franklin Barritt.
Richard Gerner.
Inventor
Theodore Merrell,
pr Henry Gerner
his Attorney.

124,757

UNITED STATES PATENT OFFICE.

THEODORE MERRELL, OF DIXON, ILLINOIS.

IMPROVEMENT IN CORN-HARVESTERS.

Specification forming part of Letters Patent No. 124,757, dated March 19, 1872.

SPECIFICATION.

I, THEODORE MERRELL, of Dixon, Lee county, State of Illinois, have invented certain Improvements in Machines for Cutting standing Corn-Stalks or Cane, of which the following is a specification:

The object of my invention is to produce a machine which shall efficiently cut standing corn-stalks or cane.

Figure 1 is a side elevation of my machine. Fig. 2 is a top view of the same.

The two driving-wheels B revolve on a fixed axle, which supports the frame A. On said axle, attached to each driving-wheel, revolves a gear, C, which gives the required motion, through connecting gears, to the fingers E E, attached to the circular disk or wheel D. Said fingers are so arranged that they may be set at any angle, or project any distance required from the disk. Said disk is provided with a set-screw, to enable it to be set at any point in the gear-stem F, which is provided, at its lower end, with a ball, which fits into a ball-socket, and so constructed that said stem may be moved forward or back at any angle required, by means of a sleeve, G, resting on the slotted standard or support H. To said sleeve is attached a rod, terminating at I, which is secured to a standard, J, by means of a bolt and nut, properly arranged. The knife or sickle K is made fast to the platform L, with raised edges, perforated or made sufficiently rough to cause stalks not to slip while resting on the inclined arm or dropper U. The sickle-platform is secured to the bar N by bolt M, made fast to said bar to act as a hinge, which bar is hinged at O to the frame for the purpose of allowing the sickle, when cutting, to raise and pass over the stubble, then drop into position for another cut, and so on. Said sickle and platform when ready for work project from the bar, and are held in position by means of an arm fixed to the sickle. To this arm is attached a rod, which again is attached to a lever, W, which is connected to the standard R, enabling the operator to open or close the sickle when desired, by reversing the said lever. The bar N, to which the sickle is hung, may be raised or lowered by the lever S, secured by a spring. When the stalks are cut they will fall on the wing or dropper U, by the assistance of the fingers, the guard, and their own weight, and there remain until a bundle accumulates, when the operator may press with his foot the lever or levers V V, raising the spring or catch. When the wing drops its load or bundle (by the weight of the same) it is given sufficient motion to set ready for another bundle, so that the machine, when passing between two rows of stalks or cane, will cut one or both, as may be desired. The levers X X enable the operators to connect or disconnect the gearing when desired. Y is a post for lines to rest on. Z Z are guards to prevent the cut stalks from falling upon the main frame. The gearing and cutting part of the machine is double.

Having thus described my invention, I desire to claim—

1. The platform L, and knife K, pivoted to the under frame N, and operated, by means of the levers, to be thrown under the main frame or on the outside thereof, substantially as herein set forth.

2. The inclined stalk-receiving dropper U, composed of three or more flanged wings connected to a standard on the outside of the main frame, and held in place by the spring-fingers connected with the lever V, all substantially as herein set forth.

3. The adjustable standard F, connected to the main frame by a ball-and-socket joint, and provided with the adjustable wheel D having adjustable fingers E, all substantially as set forth.

4. The combination of the revolving wheel or wheels D with fingers E, knife K pivoted to the hinged frame N, the guard, and the stalk-receiver U, all constructed substantially as described, and operated as herein set forth.

THEO. MERRELL.

Witnesses:
  J. C. AYRES,
  SAML. KING.